Nov. 6, 1923.
M. S. F. WILLIAMS ET AL
1,473,369
PARKING DEVICE FOR AUTOMOBILES
Filed March 24, 1922 4 Sheets-Sheet 4
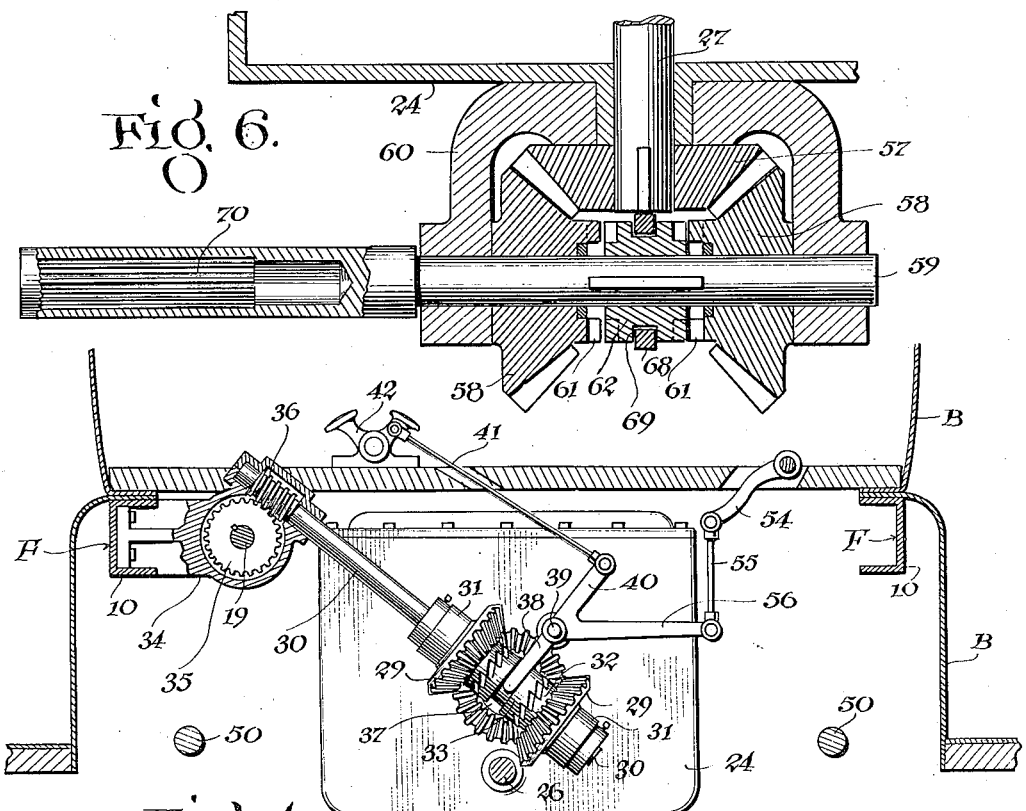
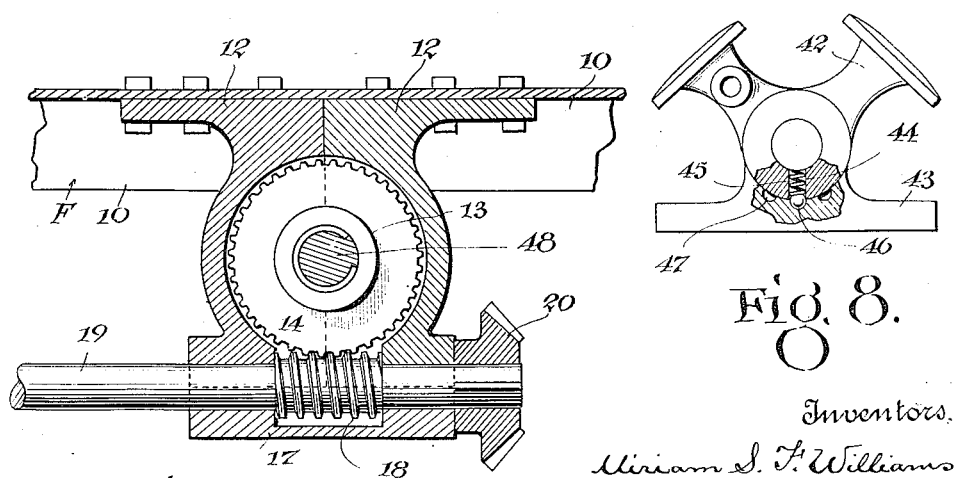
Inventors,
Miriam S. F. Williams
John K. E. Diffenderffer
By Mason & Co.
Attorneys.

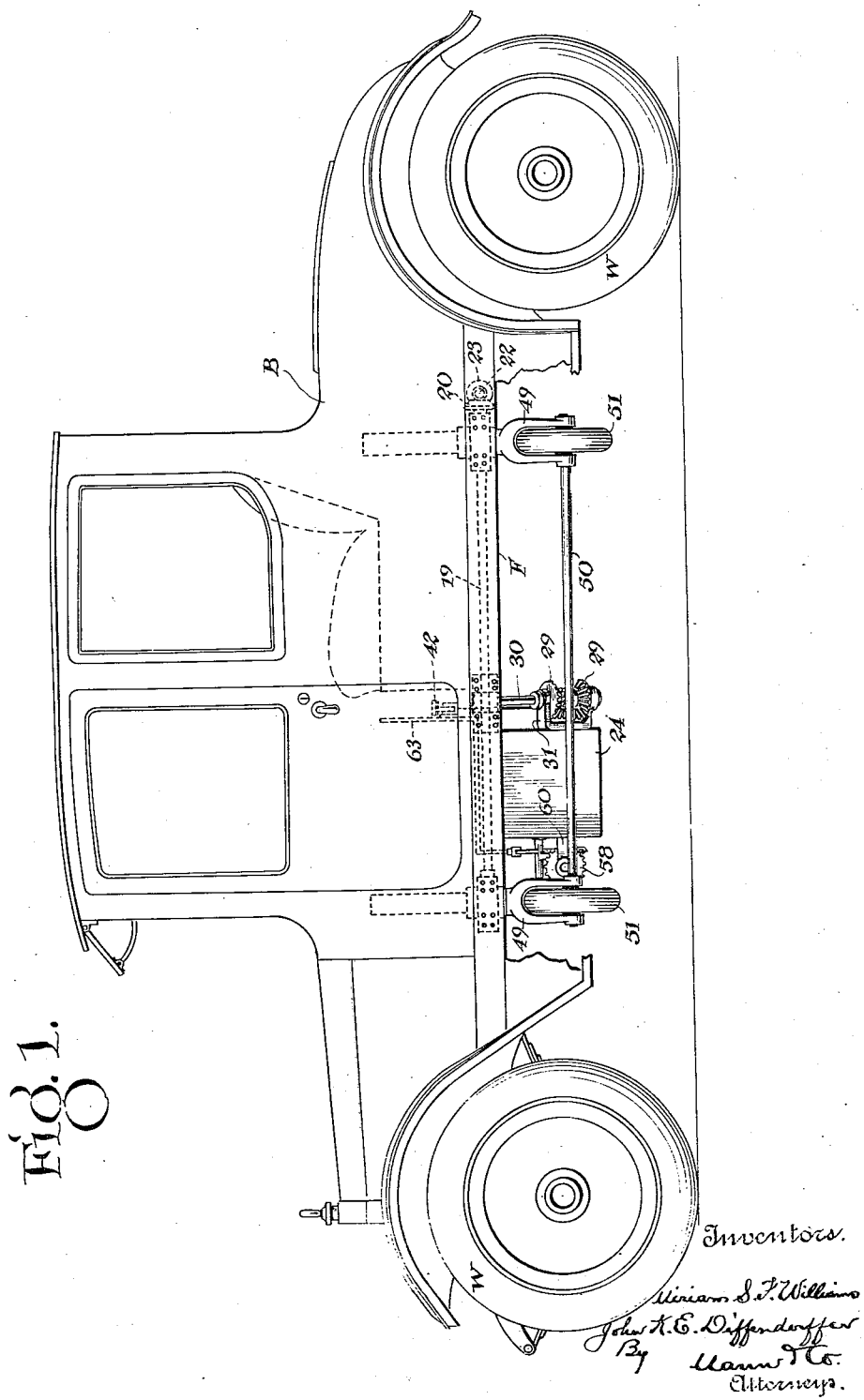

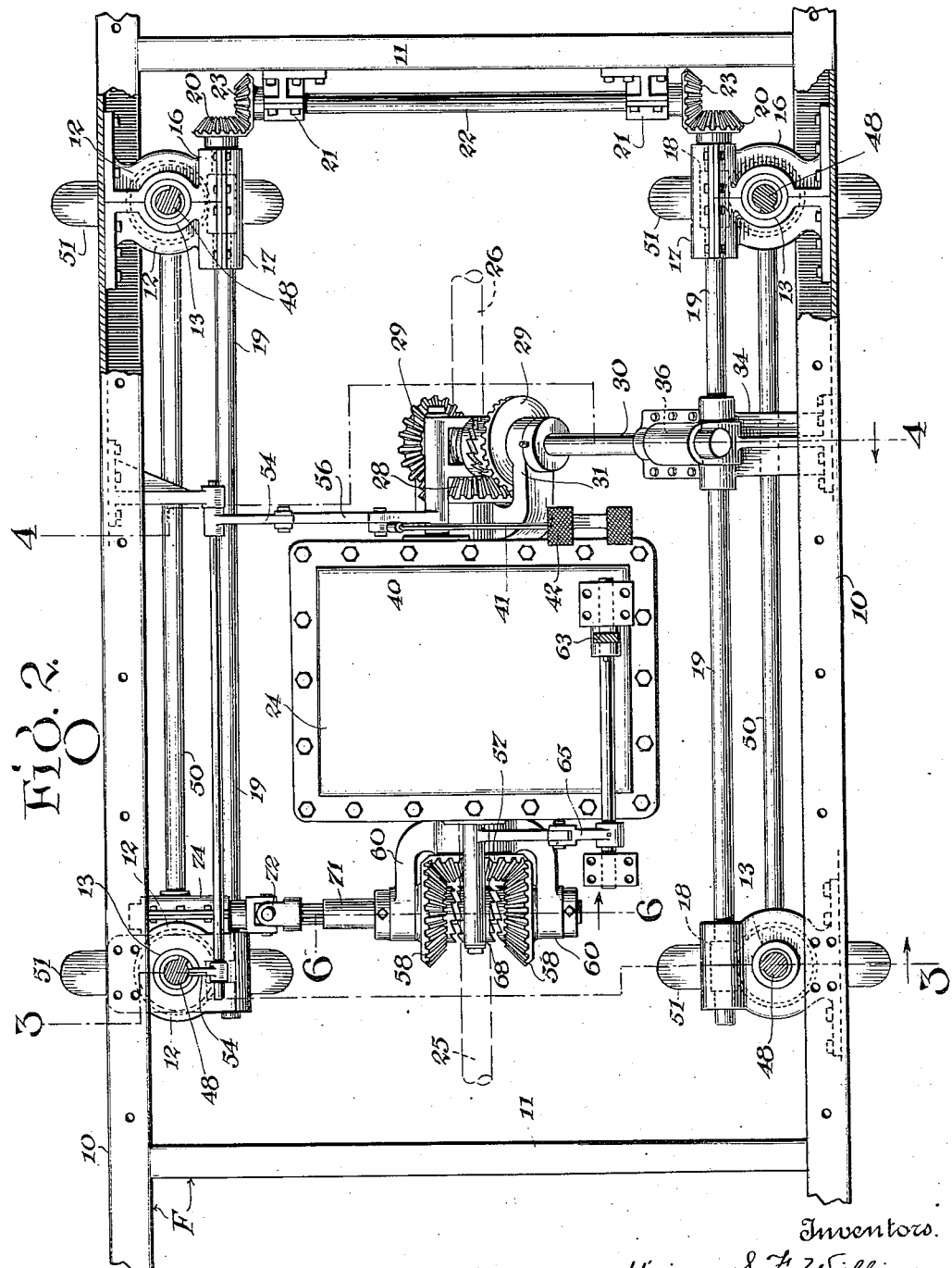

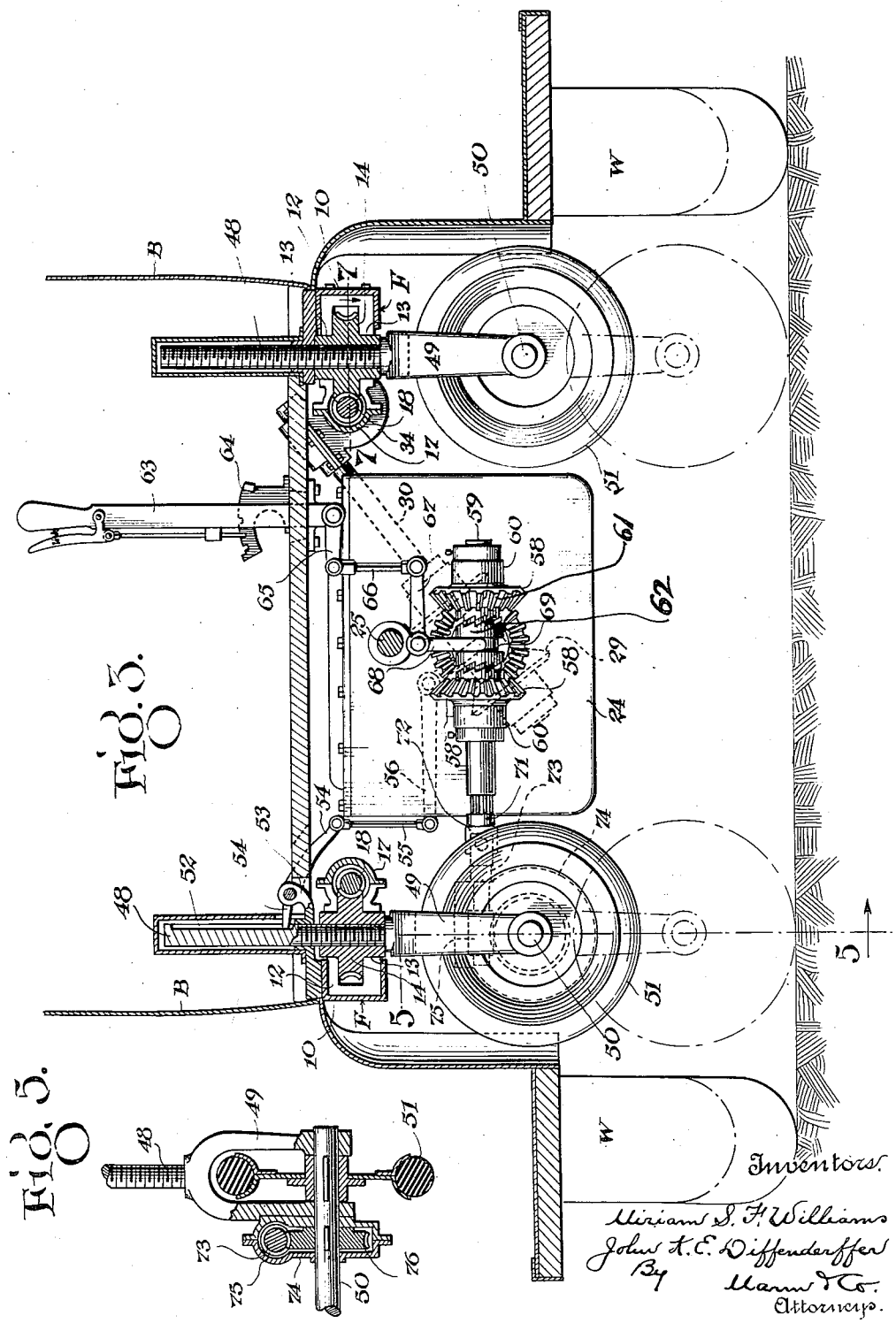

Patented Nov. 6, 1923.

1,473,369

UNITED STATES PATENT OFFICE.

MIRIAM S. F. WILLIAMS AND JOHN K. E. DIFFENDERFFER, OF BALTIMORE, MARYLAND; SAID DIFFENDERFFER ASSIGNOR TO SAID WILLIAMS.

PARKING DEVICE FOR AUTOMOBILES.

Application filed March 24, 1922. Serial No. 546,241.

*To all whom it may concern:*

Be it known that I, MIRIAM S. F. WILLIAMS, a subject of the King of England, and JOHN K. E. DIFFENDERFFER, a citizen of the United States, both residing at Baltimore, in the State of Maryland, have invented certain new and useful Improvements in Parking Devices for Automobiles, of which the following is a specification.

This invention relates to automobiles and has special reference to a parking device for automobiles.

It frequently happens that the space at a street curb, or at one side of a road, is sufficient to accommodate an automobile but is not sufficient to allow the same to be steered into the space by the usual manipulation of the steering and driving mechanism.

It also sometimes happens that after an automobile has been parked, parallel to but at one side of a street or road, by the owner, other cars are parked so close in front and at the rear of the first car that the latter cannot be steered out of the parking position without moving either the car in front or that one at the rear.

One object therefore of the present invention is to provide improved means whereby a car may be moved bodily in a sidewise direction at the will of the operator so that it may readily move, in a direction at right angles to its length, into or out of a space only slightly greater than the overall length of the vehicle.

Another object of the invention is to provide improved means, on an automobile, including a truck having a separate set of ground wheels, which ground wheels may be lowered onto the ground so as to raise and then support the car or vehicle with its ordinary driving and steering wheels elevated from the ground.

A further object of the invention is to provide an automobile, with improved means for permitting bodily sidewise movement thereof, the improved means including ground wheels arranged at right angles to the length of the vehicle and raised or lowered by power driven jacks whereby the entire vehicle including its ordinary wheels may be raised from or lowered onto the ground.

A still further object of the invention is the provision of an improved arrangement of this class wherein the ground wheels are power driven so that the operator of the machine may control its lateral movement from the seat in the same manner substantially as he controls its longitudinal movement.

With the above and other objects in view, the invention consists in general of certain novel details of construction and combinations of parts hereinafter fully described, illustrated in the accompanying drawings, and specifically claimed.

In the accompanying drawings, like characters of reference indicate like parts in the several views, and:—

Fig. 1. is a side elevation of an automobile equipped with this invention.

Fig. 2. is an enlarged plan view of a portion of the chassis of such an automobile.

Fig. 3 is a section on the line 3—3 of Fig. 2.

Fig. 4. is a section on the line 4—4 of Fig. 2.

Fig. 5. is a detail section on the line 5—5 of Fig. 3.

Fig. 6. is a detail section on a still larger scale, the section being taken on the line 6—6 of Fig. 2.

Fig. 7. is a section on the line 7—7 of Fig. 3.

Fig. 8. is a detail view, partly in section, showing a certain pedal used herewith.

The parking device forming this invention has, in the accompanying drawings, been shown attached to or in position on an automobile having the usual body "B," wheels "W" and frame "F".

The frame consists in the ordinary manner of a pair of longitudinal extending channel members 10 connected by cross frame members 11. Secured to the members 10 between the wheels "W" are certain bearing brackets. There are two of these brackets on each frame member and each bracket includes a pair of housing members 12 so constructed as to provide upper and lower bearing for the journal ends 13 of a worm wheel 14 held in the housing members. Furthermore the ends of these housing members which extend towards the center of the device provide together a half bearing 16 which is closed in by a bearing cap 17, these parts likewise constituting a housing for a worm 18 which meshes with the respective worm gear 14. The brackets on each of the members 10 are spaced a considerable distance apart and the brackets on one channel 10 are directly opposite the brackets on the other channel. Furthermore, the worms 18 on each side of the machine are connected by shafts 19 and each of these shafts is provided rearwardly with a bevel gear 20. Mounted on one of the cross frame members 11 are bearings 21 which support a shaft 22 having on its ends bevelled gears 23 which mesh with the respective bevelled gears 20. Under these circumstances it will be obvious that all of the arms, and consequently the worm gears will rotate in unison.

The automobile is provided with the usual transmission which is not deemed necessary to be specifically shown, the casing for such transmission being illustrated at 24 and the drive and tail shaft being shown respectively at 25 and 26. Driven by this transmission is a shaft 27 and on the rear of this shaft 27 is fixed a bevel gear 28 which meshes with a pair of confronting bevel gears 29 rotatably mounted on a shaft 30 supported in bearings 31 carried by the casing 24. The confronting faces of these bevelled gears are provided with clutch teeth 32. Splined on the shaft 30 is a double faced clutch member 33 which can be moved to engage the clutch teeth of one or the other of the gears 29. By this means the shaft 30 can be caused to revolve in one direction or the other. Secured to one of the channels 10 is a housing 34 wherethrough passes one of the shafts 19. Keyed on said shaft within the housing is a worm wheel 35 which is engaged by a worm 36 on the shaft 30, the housing 34 being provided with suitable bearings for the shaft 30. In the member 33 is formed the usual shipper groove 37 wherein engages the arms of a shipper fork 38 pivoted on a pin 39 supported by the casing 24. Extending from this shipper fork is an arm 40 which is connected by a reach rod or link 41 with one of the arms of a bifurcated pedal 42. This pedal 42 is mounted to revolve in a bracket 43 and extending into the hub of said pedal is a radial recess 44 wherein is located a spring 45 pressing against a pawl 46 so as to urge the latter outwardly and into one of a plurality of seats 47 formed in the bracket 43. By this means the pedal 42, when moved into one position or the other, will be held against accidental displacement.

In the operation of this part of the device the pedal 42 is moved in the proper direction to cause the member 33 to engage one or the other set of gear supported clutch teeth 32. This causes rotation of the shaft 30 which, through the worm 36 and gear 35 rotates the shaft 19 carrying said gear. Consequently all of the worm gears 14 will be thereby rotated. Each of these worm gears constitutes a nut, being provided with a centrally disposed opening for the reception of the screw threaded stem 48 of a wheel fork 49. Through the wheel forks at each side of the vehicle extends a shaft 50 whereon is fixed the ground wheels 51, one of these wheels being located between the arms of each fork. It will now be obvious that the rotation of the worm wheels 14 in one direction will feed the stems 48 downward since they will be held from rotation by the shaft 50. If this movement continues the ground wheels 51 will contact with the ground and raise the wheels W clear of the ground thus permitting the vehicle to be moved laterally since the wheels 51 are at right angles to the wheels "W".

In order to prevent too great upper or downward movement of the stem 48 an automatic clutch disengaging arrangement is used. To this end one of the stems 48 is provided with a groove or splineway 52 and supported adjacent this particular stem by a bracket 53 is a lever 54 one end of which enters the splineway. This splineway is of such length that at the limit of the upward movement of the wheels 51 the lower end of the splineway will engage the lever 54 and at the limit of downward movement the upper end of said splineway will engage said lever. This lever is connected by a link 55 with an arm 56 fixed to the shipper fork 38. Thus if the clutch 33 is engaged to produce downward movement of the wheels 51 these wheels will move down until the lever 54 is moved by the upper end of the splineway whereupon the clutch 33 will be disengaged. Obviously upward movement of the wheels 51 is automatically limited in the same manner.

In order to drive the ground wheel shaft on one side of the car or the other, it being unnecessary obviously to drive both sides, there is provided on the front end of the shaft 27 a bevel gear 57 which meshes with a pair of confronting bevel gears 58 rotatably mounted on a shaft 59 supported in a bracket 60 carried by the casing 24. The confronting faces of these gears 58 are provided with clutch teeth 61. Between these clutch teeth a clutch member 62 is splined on the shaft 59. The position of the clutch 62 is controlled by a latch lever 63 cooperating with a segment 64 and actuating a rock arm 65 which is connected by a link 66 with the rock arm 67 of a shipper fork 68 engaging a groove 69 in the member 62. One end of the shaft 59 is hollow and is provided with internal spline teeth 70 engaging in spline grooves on a shaft 71 connected by a universal joint 72 with a shaft 73. On one of the forks 49 is a housing 74 wherethrough the end of the shaft 73 passes. Within this housing the shaft 73 is provided with a worm 75 which meshes with a worm wheel 76 fixed on the respective shaft 50. It will be seen that the shafts 71 and 59 together constitute a telescopic shaft and that the universal joint 72 permits the driving of the shafts 71 and 73 through the various angles assumed by the upward and downward movements of the wheels 51.

In recapitulating the operation we will suppose the parts to be in position shown in Fig. 1 and in full lines in Fig. 3, and the operator wishes to move the vehicle bodily in a lateral direction. He then moves the pedal 42 to bring the wheels 51 downward. When the wheels have moved downward to their lowermost position, as shown in broken lines in Figure 3, the wheels "W" will be lifted as also shown in broken lines in that figure. He then moves the latch lever 63 to the proper direction and the car moves sidewise in one direction or the other as may be desired. Upon the car arriving at the desired position laterally he moves the lever 63 to disengage the clutch. This stops further lateral movement of the car. He then moves the pedal 42 to raise the wheels 51 and bring the ground wheels "W" into contact with the ground after which the vehicle may be driven in the usual manner.

It will be noted that in the present showing the angular relation between the shafts 71 and 73 may appear to be somewhat too close to a right angle. It is to be understood that the joint 72 with the several shaft sections is to be taken merely as typically illustrative of any desired form of extensible shafting wherein the driven end of the shaft piece is at an angle to the driving end and such angle is capable of variations between desired limiting position.

There has thus been provided a simple and efficient device of the kind described and for the purposes specified.

It is obvious that minor changes may be made in the form and construction of the invention without departing from the material principles thereof. It is not therefore desired to confine the invention to the exact form herein shown and described, but it is desired to include all such as properly come within the scope claimed.

Having thus described the invention, what is claimed as new, is:—

1. A parking device for vehicles including a pair of spaced jacks at each side of the vehicle having vertically movable elements provided with ground wheels at their lower ends, means at the upper end of each jack for moving said elements vertically, gearing connecting said means to cause the same to operate in unison, said gearing including a motion reversing device and being arranged for driving from a power shaft of the vehicle, a shaft connecting the ground wheels at one side of the vehicle, and gearing for driving said shaft independent of the first mentioned gearing, said last gearing including a motion reversing device and being arranged for connection to a power shaft of the vehicle.

2. A parking device for vehicles including a pair of spaced jacks at each side of the vehicle having vertically movable elements provided with ground wheels at their lower ends, means at the upper end of each jack for moving said elements vertically, gearing connecting said means to cause the same to move in unison, a shaft connecting said ground wheels at one side of the vehicle, gearing for driving said shaft, and reversing means for said gearings arranged to operate either of said gearings independently and selectively in each direction.

3. A parking device for vehicles having a power plant provided with a power shaft and including a pair of spaced jacks at each side of the vehicle having vertically movable elements provided at their lower ends with ground wheels, means at the upper end of each jack for moving said elements vertically, longitudinal shafts each connecting the element moving means of the pair of jacks at one side of the vehicle, a transverse shaft geared to the first shafts to cause the latter to revolve in unison, a shaft connecting the ground wheels at one side of the vehicle, and driving means arranged for connection to the power shaft and for one of the first mentioned longitudinal shafts and for the last mentioned shaft.

4. A parking device for vehicles having a power plant provided with a power shaft and including a pair of spaced jacks at each side of the vehicle having vertically movable elements provided at their lower ends with ground wheels, means at the upper end of each jack for moving said elements vertically, longitudinal shafts each connecting the element moving means of the pair of jacks at one side of the vehicle, a transverse shaft geared to the first shafts to cause the latter to revolve in unison, a shaft connecting the ground wheels at one side of the vehicle, driving means arranged for connection to the power shaft and for one of the first mentioned longitudinal shafts and for the last mentioned shaft, said driving means including a reversing mechanism for independently operating the shafts to which it is connected selectively in either direction.

5. A parking device for vehicles including a pair of spaced jacks at each side of the vehicle and having vertically movable elements provided with bearings at their lower ends, a longitudinally disposed shaft on each side of the vehicle supported in said bearings, a pair of spaced wheels on each shaft, a second pair of shafts each shaft of the second pair being disposed longitudinally beside a respective first shaft, gearing connecting the second pair of shafts, means to drive one of the said shafts of the second pair, and other means to drive one of the shafts of the first pair.

6. A parking device for vehicles having a power plant provided with a power shaft and including a pair of spaced jacks at each side of the vehicle having vertically movable elements provided at their lower ends with ground wheels, means at the upper end of each jack for moving said elements vertically, longitudinal shafts each connecting the element moving means of the pair of jacks at one side of the vehicle, a transverse shaft geared to the first shaft to cause the latter to revolve in unison, a shaft connecting the ground wheels at one side of the vehicle, driving means connecting one of the first mentioned longitudinal shafts and the power shaft, and other driving means connecting the ground wheel shaft and the power shaft, said driving means being independent of each other and each including mechanism for reversing the direction of motion of the shaft which it drives.

7. A parking device for vehicles having a power plant provided with a power shaft and including a pair of spaced jacks at each side of the vehicle having vertically movable elements provided at their lower ends with ground wheels, means at the upper end of each jack for moving said elements vertically, longitudinal shafts each connecting the element moving means of the pair of jacks at one side of the vehicle, a transverse shaft geared to the first shafts to cause the latter to revolve in unison, a shaft connecting the ground wheels at one side of the vehicle, driving means connecting one of the first mentioned longitudinal shafts and the power shaft, and other driving means connecting the ground wheel shaft and the power shaft, and including an extensible shaft, said driving means being independent of each other and each including mechanism for reversing the direction of motion of the shaft which it drives.

8. A parking device for vehicles including a pair of spaced jacks at each side of the vehicle and having vertically movable elements provided with bearings at their lower ends, a longitudinally disposed shaft on each side of the vehicle supported in said bearings, a pair of spaced wheels on each shaft, a second pair of shafts each disposed longitudinally beside a respective pair of jacks, gearing connecting each of the jacks with a respective second shaft, other gearing connecting the second pair of shafts, a driving shaft, a bevel gear fixed on said driving shaft, a pair of confronting bevel gears wherewith the first gear meshes, a shaft whereon the pair of bevel gears are rotatably mounted, a clutch arranged for selectively clutching either of the pair of bevel gears to the shaft whereon it is mounted, means to actuate said clutch, other means to disengage the clutch automatically at predetermined positions of said jacks, and means to connect the driving shaft with one of the wheel carrying shafts and including a reversing clutch mechanism.

9. A parking device for vehicles having a power plant provided with a power shaft and including a pair of spaced jacks for each side of said vehicle, each having a jack screw movable vertically, and a nut on said screw mounted for rotative movement in a fixed position, a pair of shafts connecting said jacks in pairs, and geared to said nuts, a third shaft geared to said pair of shafts to cause the same to rotate in unison, a short shaft driven by the power shaft, a bevel gear on said short shaft, a yoke rotatably mounted on the short shaft, a shaft journalled in said yoke and geared to one of the nut actuating shafts, a pair of clutch members provided bevel gears rotatably mounted on the last mentioned shaft and meshing with the first bevel gear, a double faced clutch member splined on the last mentioned shaft between the pair of bevel gears, means to shift the double faced clutch member into selective engagement with the clutch members on said bevel gears, and means to drive the ground wheels.

10. A parking device for vehicles having a power plant provided with a power shaft and including a pair of spaced jacks for each side of the vehicle, each provided with a vertically movable element carrying a ground wheel at its lower end, means to elevate and depress said ground wheels, a shaft connecting the ground wheels on one side of the vehicle, a short shaft driven from the power shaft, a bevel gear on said short shaft, a yoke rotatably mounted on said short shaft, a telescopic shaft having one section journalled in said yoke and a second section geared to the ground wheel shaft, a pair of confronting bevel gears revolubly mounted on the first mentioned section and meshing with the first bevel gear, a clutch member carried by each gear of the pair on its confronting side, a double faced clutch member splined to the first mentioned section, and means to move the double faced clutch member selectively into engagement with the clutch members on the pair of bevel gears.

11. A parking device for vehicles including a pair of spaced jacks at each side of the vehicle having vertically movable elements provided with ground wheels at their lower ends, means at the upper end of each jack for moving said elements vertically, gearing connecting said means to cause the same to operate in unison, said gearing including a motion reversing device and being arranged for driving from a power shaft of the vehicle, an automatic throw out limiting the action of said gearing, a shaft connecting the ground wheels at one side of the vehicle, and gearing for driving said shaft independent of the first mentioned gearing, said last gearing including a motion reversing device and being arranged for connection to a power shaft of the vehicle.

12. A parking device for vehicles including a pair of spaced jacks at each side of the vehicle having vertically movable elements provided with ground wheels at their lower ends, means at the upper end of each jack for moving said elements vertically, gearing connecting said means to cause the same to move in unison, a shaft connecting said ground wheels at one side of the vehicle, gearing for driving said shaft, reversing means for said gearings arranged to operate either of said gearings independently and selectively in each direction, and an automatic throw out for limiting the action of the first mentioned gearing.

13. A parking device for vehicles having a power plant provided with a power shaft and including a pair of spaced jacks at each side of the vehicle having vertically movable elements provided at their lower ends with ground wheels, means at the upper end of each jack for moving said elements vertically, longitudinal shafts each connecting the element moving means of the pair of jacks at one side of the vehicle, a transverse shaft geared to the first shafts to cause the latter to revolve in unison, a shaft connecting the ground wheels at one side of the vehicle, driving means connecting one of the first mentioned longitudinal shafts and the power shaft, other driving means connecting the ground wheel shaft and the power shaft, said driving means being independent of each other and each including mechanism for reversing the direction of motion of the shaft which it drives, and an automatic throw out limiting the action of the first mentioned driving means.

14. In a parking device for vehicles having a power plant, jacks carried by the vehicle and including vertically movable elements provided at their lower ends with ground wheels, a shaft connecting the ground wheels on one side of said vehicle, and reversible gearing connecting said shaft and the power plant.

In testimony whereof they affix their signatures.

MIRIAM S. F. WILLIAMS.
JOHN K. E. DIFFENDERFFER.